United States Patent
Hopper et al.

(10) Patent No.: US 7,328,609 B1
(45) Date of Patent: Feb. 12, 2008

(54) WIRELESS PRESSURE SENSING SCHRADER VALVE

(75) Inventors: Peter J. Hopper, San Jose, CA (US); Michael Mian, Livermore, CA (US); Kyuwoon Hwang, Palo Alto, CA (US); Robert Drury, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/977,168

(22) Filed: Oct. 29, 2004

(51) Int. Cl.
*B60C 23/02* (2006.01)

(52) U.S. Cl. .................................... 73/146.8

(58) Field of Classification Search ............ 73/146, 73/146.8, 16.2
See application file for complete search history.

(56) References Cited

U.S. PATENT DOCUMENTS

| | | | | |
|---|---|---|---|---|
| 2,361,890 A * | 10/1944 | Watson | ........................ | 137/223 |
| 2,749,931 A * | 6/1956 | Battin | ........................ | 137/233 |
| 4,836,235 A * | 6/1989 | Pagani | ........................ | 137/223 |
| 4,881,410 A | 11/1989 | Wise et al. | .................... | 73/724 |
| 4,996,627 A | 2/1991 | Zias et al. | .................. | 361/283 |
| 5,663,508 A | 9/1997 | Sparks | ..................... | 73/861.71 |
| 5,963,788 A | 10/1999 | Barron et al. | .................. | 438/48 |
| 5,987,980 A * | 11/1999 | Mangafas et al. | ......... | 73/146.8 |
| 6,445,053 B1 | 9/2002 | Cho | ........................... | 257/417 |
| 6,472,243 B2 | 10/2002 | Gogoi et al. | .................. | 438/50 |
| 6,758,089 B2 * | 7/2004 | Breed et al. | .................. | 73/146 |
| 6,948,516 B1 * | 9/2005 | Williams | .................... | 137/224 |
| 2002/0115920 A1 | 8/2002 | Rich et al. | ................... | 600/345 |
| 2002/0121132 A1 * | 9/2002 | Breed et al. | .................. | 73/146 |
| 2003/0005759 A1 * | 1/2003 | Breed et al. | .................. | 73/146 |
| 2004/0016995 A1 | 1/2004 | Kuo et al. | ................... | 257/678 |
| 2005/0208696 A1 | 9/2005 | Villa et al. | ..................... | 438/53 |

* cited by examiner

*Primary Examiner*—Andre J. Allen
(74) *Attorney, Agent, or Firm*—Stallman & Pollock LLP

(57) ABSTRACT

A wireless tire pressure sensing system based upon a Schrader valve design is provided. The system includes a valve body, a valve pin and a compression element for sealing engaging the valve body and the valve pin to maintain tire pressure. A pressure sensing device mounted within the valve body and connected to valve pin senses the pressure within the tire and provides its signal to the valve pin. The valve pin is adapted as a component of an antenna that transmits a wireless pressure signal to a remote receiver/transmitter mounted on the vehicle. The receiver/transmitter transmits a corresponding signal to a vehicle control system that generates a warning signal when the tire pressure is below a threshold safety value.

2 Claims, 3 Drawing Sheets

WIRELESS PRESSURE SENSING SCHRADER VALVE

TECHNICAL FIELD

The present invention relates to structure and methods for implementing a Schrader valve that integrates a wireless pressure sensing system.

BACKGROUND OF THE INVENTION

Vehicles operated with underinflated tires pose a significant safety problem. A major contributor to the high rate of tire failures due to underinflation and gradual pressure loss is that many people do not know whether or not their vehicle's tires are properly inflated. The U.S. Congress has mandated that automobile manufacturers implement a tire pressure monitoring system by 2007 for automobiles operating the in the U.S.

A typical tire pressure monitoring system includes a sensor/transmitter at each wheel to monitor pressure in the tires and a receiver inside the vehicle. Each sensor periodically transmits its unique ID and the pressure in the associated tire to the receiver. The received pressure value is compared to an acceptable pressure level and, if the measured pressure is outside acceptable parameters, a warning is issued to the driver.

Tire pressure monitoring systems can be classified as two types: wheel speed based, or indirect, systems and pressure sensor based, or direct, systems. Wheel speed based systems infer tire pressures using the vehicle's anti-lock braking system wheel speed sensors to measure tire-to-tire differences in rotational velocities that indicate that one tire is at a different pressure from the others. Pressure sensor based systems directly measure tire pressures with pressure sensors mounted either inside the tire or on the stem valve. For a variety of reasons, pressure sensor based systems are preferable.

However, currently available pressure sensor based systems do have some disadvantages. For example, pressure sensor based systems that are mounted inside the tire can suffer from signal degradation due to the interference caused by steel elements used in the tire structure.

DESCRIPTION OF THE INVENTION

The present invention provides a wireless pressure sensor based system for monitoring tire pressure that utilizes the general design of a conventional Schrader valve. More specifically, modifications are made to a Schrader that integrate an antenna into the release pin and restoring spring. The force applied to a pressure sensing element mounted on the valve gasket is proportional to the pressure in the tire. This induces a charge across the pressure sensing element that effects the inductive response of the antenna, which a transceiver measures.

The features and advantages of the present invention will be more fully appreciated upon consideration of the following detailed description of the invention and the accompanying drawings that set forth an illustrative embodiment in which the principles of the invention are utilized.

Figure 1:
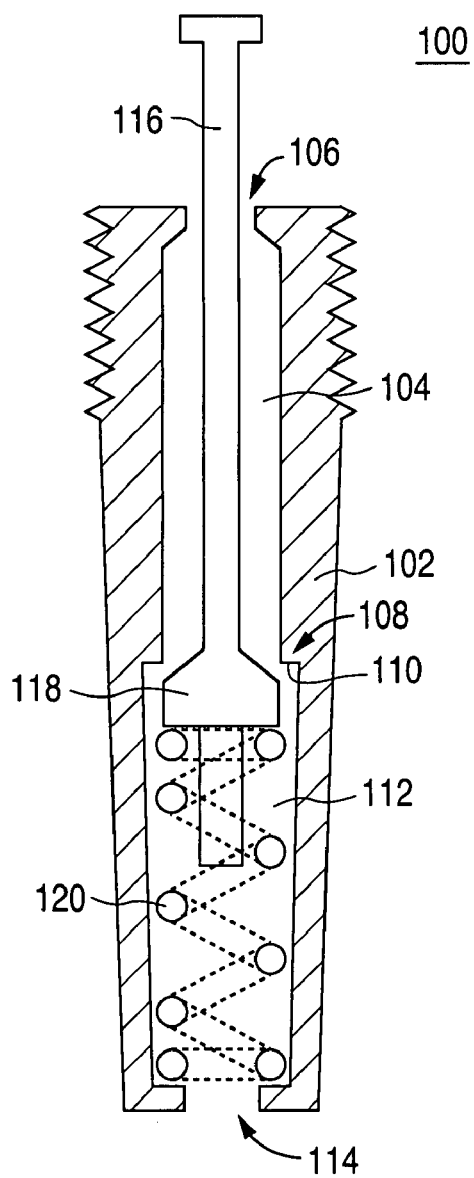
FIG. 1 is a cross section drawing illustrating a conventional Schrader valve.

FIG. 1 shows a conventional Schrader valve 100. The valve 100 includes a metal valve body 102 that fits into a rubber base (not shown) that is adapted for engagement with a rim hole opening of a tire. The valve body 102 has an axial passage 104 that is reduced at its upper end to provide a pin retaining opening 106. The valve body 102 includes a central flange opening 108 the edge of which forms a downwardly facing seat 110. The bottom portion of the valve body 102 forms a spring retainer cup 112 that has a central opening 114 in its bottom wall. A valve pin 116 extends down through the pin retaining opening 106. The valve pin 116 includes a resilient valve flange 118 which may have a tapered upper surface to assist in centering the valve flange 118 on the seat 110. An axial spring 120 is disposed in compression in the spring retainer cup 112. The upper end of the spring 120 engages under the valve flange 118 and surrounds the lower end of the valve pin 116. The lower end of the spring 120 engages the bottom wall of the spring retainer cup 112. The upper end of the valve body 102 is typically threaded to allow for threaded engagement with a protective cap (not shown).

Those skilled in the art will appreciate that the spring 120 normally maintains the resilient flange 118 in sealing engagement with the valve seat 110, thus maintaining the pressure within the tire. Force applied to the valve pin 116 opens the valve to allow air to be added to the tire to increase its pressure, or for air to escape from the tire to reduce its pressure.

As stated above, the present invention provides a wireless tire pressure sensing system that is based upon modifications to the conventional Schrader valve architecture. An embodiment of a Schrader valve based wireless tire pressure sensing system 200 is shown in FIG. 2.

Figure 2:
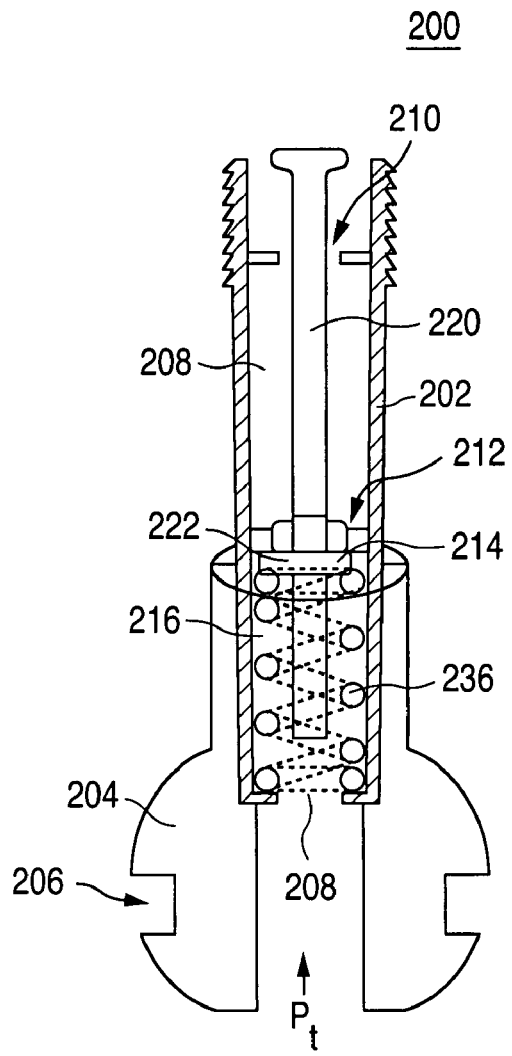
FIG. 2 is a cross section drawing illustrating a wireless pressure sensing system in accordance with the concepts of the present invention.

The FIG. 2 wireless tire pressure sensing system 200 includes a metal valve body 202 that fits into sealing engagement with a rubber base 204 that includes a circumferential groove 206 that is adapted for engagement with a rim hole of a tire (not shown) in the conventional manner. The valve body 202 includes an axial passage 208 that is reduced at its upper end to provide an antenna pin opening 210. The valve body includes a central flange opening 212 the edge of which forms a downwardly facing seat 214. The bottom portion of the valve body 202 forms a spring retainer cup 216 that has a central opening 218 formed in its lower wall. A valve antenna pin 220 extends down through the pin opening 210. The valve pin includes a resilient flange/sensor assembly 222, an exemplary embodiment of which is shown in greater detail in FIGS. 2A and 2B. The flange/sensor assembly 222 can have any of a number of designs that will be apparent to those skilled in the art.

Figure 2A:
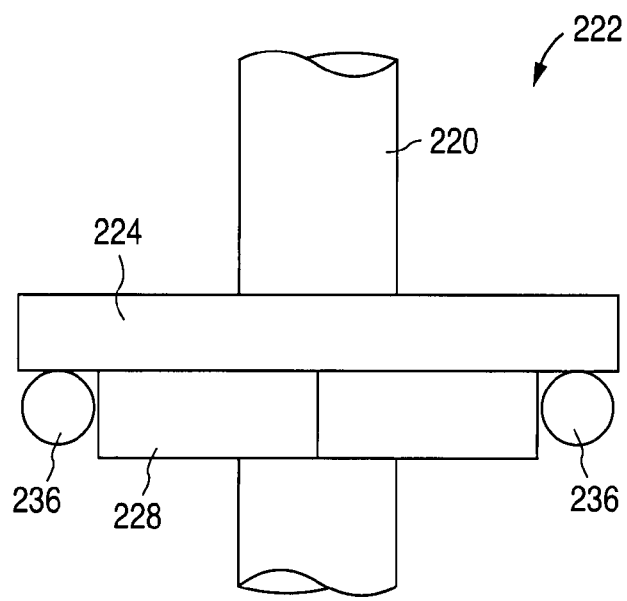
FIG. 2A is a cross section schematic drawing illustrating an embodiment of a flange/sensor assembly utilizable in accordance with the present invention.
Figure 2B:
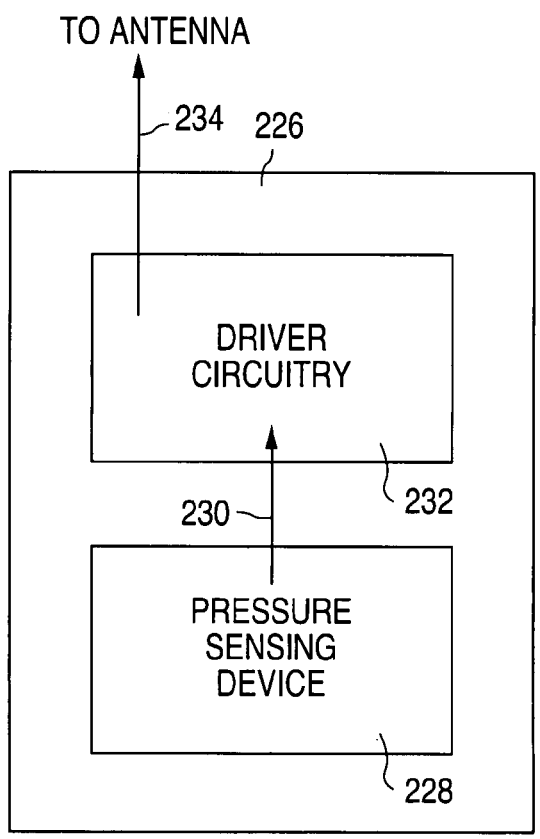
FIG. 2B is a block diagram illustrating a pressure sensor system utilizable in accordance with the present invention.

As shown in FIGS. 2A and 2B, the flange/sensor assembly 222 includes an upper resilient surface 224 adapted for sealing engagement with the valve seat 214. The assembly 222 also includes a pressure sensor system 226 that includes a pressure sensing device 228 that senses the pressure $P_t$ within the tire and provides a corresponding electrical tire pressure signal 230. The pressure sensor system 226 also includes driver circuitry 232 connected between the pressure sensing device 228 and the pin antenna 220. The driver circuitry 232 receives the tire pressure signal 230 from the pressure sensing device 228, converts it to a tire pressure monitoring signal 234 that is provided to the antenna pin 220. The antenna pin 220 transmits the tire pressure monitoring signal 234 to a remote receiver/transmitter (not shown) mounted, for example, in the wheel well of the tire. The receiver/transmitter transmits the tire pressure monitoring signal to an on-board processing system that asserts a warning light to the driver if the tire pressure $P_t$ is less than a desired threshold value.

With reference to FIG. 2, an axial spring 236 is disposed in compression in the spring retainer cup 216 of the valve body 202. The upper end of the spring 236 engages the flange/sensor assembly 222 and surrounds the lower end of the antenna pin 220. The lower end of the spring 236 engages the bottom wall of the spring retainer cup 216. The upper end of the valve body is threaded for engagement with a protective cap (not shown).

Those skilled in the art will appreciate that the pressure sensing device 228 and the driver circuitry can be conventional; for example, the pressure sensing device 228 can be a conventional piezoelectric pressure sensing device.

Figure 3:
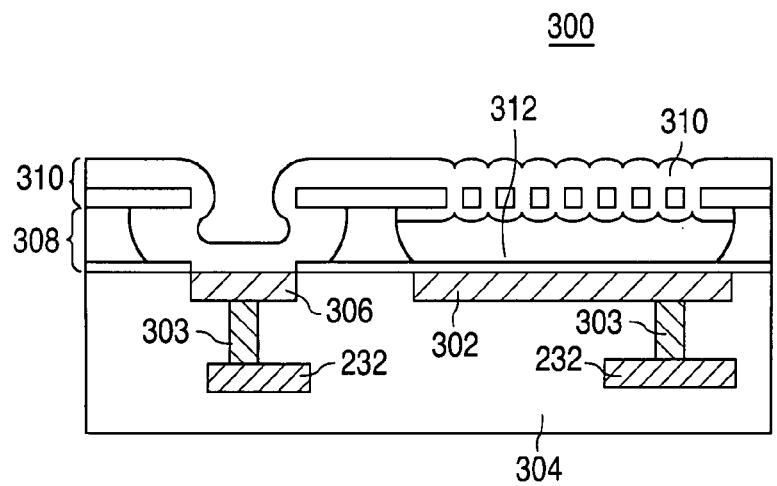
FIG. 3 is a cross section drawing illustrating an embodiment of a pressure sensing device utilizable in accordance with the present invention.

FIG. 3 shows an embodiment of a capacitive pressure sensing device 300 that can utilized in the pressure sensing system 226. The pressure sensing device 300 includes a lower capacitor plate 302 formed at an upper surface of a semiconductor substrate 304. The lower capacitor plate is electrically coupled, via interconnect structure 303, to the driver circuitry 232 that is also formed in the semiconductor substrate 304. A conductive pad 306 is also formed at the upper surface of the semiconductor substrate 304 and is space-apart from the lower capacitor plate 302. The conductive pad 306 is also electrically coupled to the driver circuitry 232 via interconnect structure 303. Patterned dielectric material 308 is formed over the upper surface of the semiconductor substrate 304. The patterned dielectric material 308 has a first opening formed therein to expose the conductive pad 306. The patterned dielectric material 308 also has a second opening formed therein over the lower capacitor plate 302. An upper conductive layer 310 is formed over the patterned dielectric material 308. The upper conductive layer 310 extends into the first opening in the patterned dielectric material 308 to form electrical contact with the conductive pad 306. The upper conductive layer 310 also extends over the second opening in the patterned dielectric material to define an enclosed pressure cavity 312 between the lower capacitor plate 302 and the upper conductive layer 310. Further detail regarding the pressure sensing device 300 may be obtained from co-pending and commonly assigned U.S. Application Ser. No. 10/976,449, filed on the same date as this application by Peter J. Hopper et al., titled "MEMS Pressure Sensing Device", which application is hereby incorporated by reference in its entirety.

Figure 4:
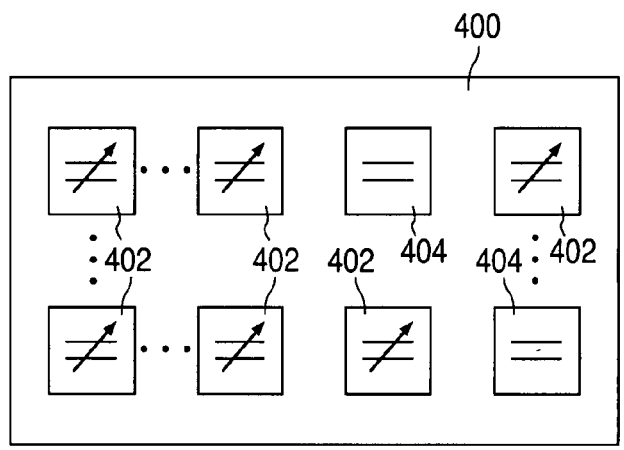
FIG. 4 is a block diagram illustrating an alternate embodiment of a pressure sensing device utilizable in accordance with the present invention.
Figure 5:
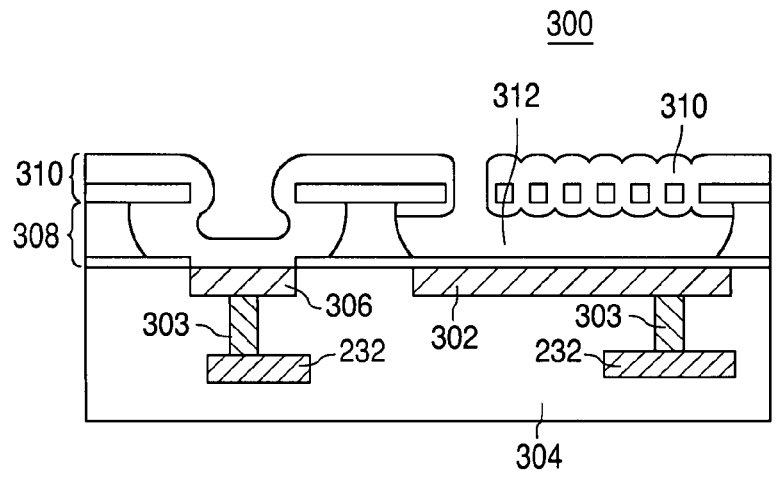
FIG. 5 is a cross section drawing illustrating a leaking pressure sensing element utilizable in the FIG. 4 pressure sensing system.

FIGS. 4 and 5 show an alternate embodiment of a pressure sensing device that can be utilized in the pressure sensing system 226.

FIG. 4 shows a pressure sensor array 400 that includes a plurality of enclosed cavity pressure sensing devices 402 of the type described above with respect to FIG. 3 and at least one "leaking cavity" device 404 that experiences zero pressure differential across its membrane.

With reference to FIG. 5, those skilled in the art will appreciate that one way of providing a leaking cavity device 404 is to provide an opening in the upper conductive layer 310 of the FIG. 3 device 300. By providing one or more leaking cavity devices in the sensor array 400 to provide a reference pressure signal, the mechanical and thermal properties of the membrane in the closed cavity devices 300 can be backed out through the use of conventional differential capacitive bridge circuitry. Further details regarding the pressure sensing device shown in FIGS. 4 and 5 may be obtained from co-pending and commonly assigned U.S. Application Ser. No. 10/977,169, filed on the same date as this application by Peter J. Hopper et al., titled, "MEMS Pressure Sensing Array with Leaking Sensor", which application is hereby incorporated by reference in its entirety.

It should be understood that the particular embodiments of the invention described above have been provided by way of example and that other modifications may occur to those skilled in the art without departing from the scope and spirit of the invention as expressed in the appended claims and their equivalents.

What is claimed is:

1. A wireless tire pressure sensing system comprising:
   a tire valve body adapted for sealing engagement with a tire and for air flow communication with the interior cavity defined by the tire;
   a valve pin mounted within the tire valve body, the valve pin being adapted for sealing engagement with the tire valve body when a preselected force is applied to the valve pin;
   a compression element mounted within the tire valve body, the compression element being in contact with the valve pin to urge the valve pin into sealing engagement with the valve body to maintain a pressure within the interior cavity of the tire;
   at least one enclosed cavity pressure sensing device mounted within the valve body for generating an output electrical pressure signal that corresponds to the pressure within the interior cavity of the tire, the pressure sensing device being connected to the valve pin to provide the output electrical pressure signal thereto, the pressure sensing device including
   (i) driver circuitry;
   (ii) a conductive lower capacitor plate formed at an upper surface of a semiconductor substrate, the lower capacitive plate being conductively coupled to the driver circuitry;
   (iii) a conductive pad formed at the upper surface of the semiconductor substrate and spaced-apart from the lower capacitor plate, the conductive pad being conductively coupled to the driver circuitry;
   (iv) patterned dielectric material formed over the upper surface of the semiconductor substrate and having a first opening formed therein to expose an upper surface of the conductive pad and having a second opening formed therein over the lower capacitor plate;
   (v) a supporting layer of dielectric material formed on the patterned dielectric material, the supporting layer having a first opening formed therein over the conductive pad and having a plurality of opening formed therein over the second opening in the patterned dielectric material; and (vi) an upper layer of conductive material formed on the supporting layer and extending through the first opening in the supporting layer and into the first opening in the patterned dielectric material to form electrical contact with the exposed upper surface of the conductive pad, the upper layer of conductive material extending over the plurality of opening formed in the supporting layer to close said openings to define an enclosed cavity between the lower capacitor plate and the upper conductive layer, and wherein the valve pin comprises an antenna adapted to transmit a wireless pressure signal that corresponds to the pressure within the interior cavity of the tire.

2. A wireless tire pressure sensing system as in claim 1, and further comprising:

at least one leaky cavity pressure device formed on the semiconductor substrate and adapted for developing a tire cavity reference pressure signal;

differential circuitry formed on the semiconductor substrate and coupled to compare the electrical pressure signal from the at least one enclosed cavity pressure sensing device and the reference pressure signal at least one leaky cavity pressure sensing device to provide an input electrical pressure signal to the driver circuitry, the driver circuitry being responsive to the input electrical pressure signal by providing the output electrical pressure signal.

* * * * *